P. O. KEILHOLTZ.
REGULATOR.
APPLICATION FILED MAR. 17, 1916.

1,321,054.

Patented Nov. 4, 1919.
3 SHEETS—SHEET 1.

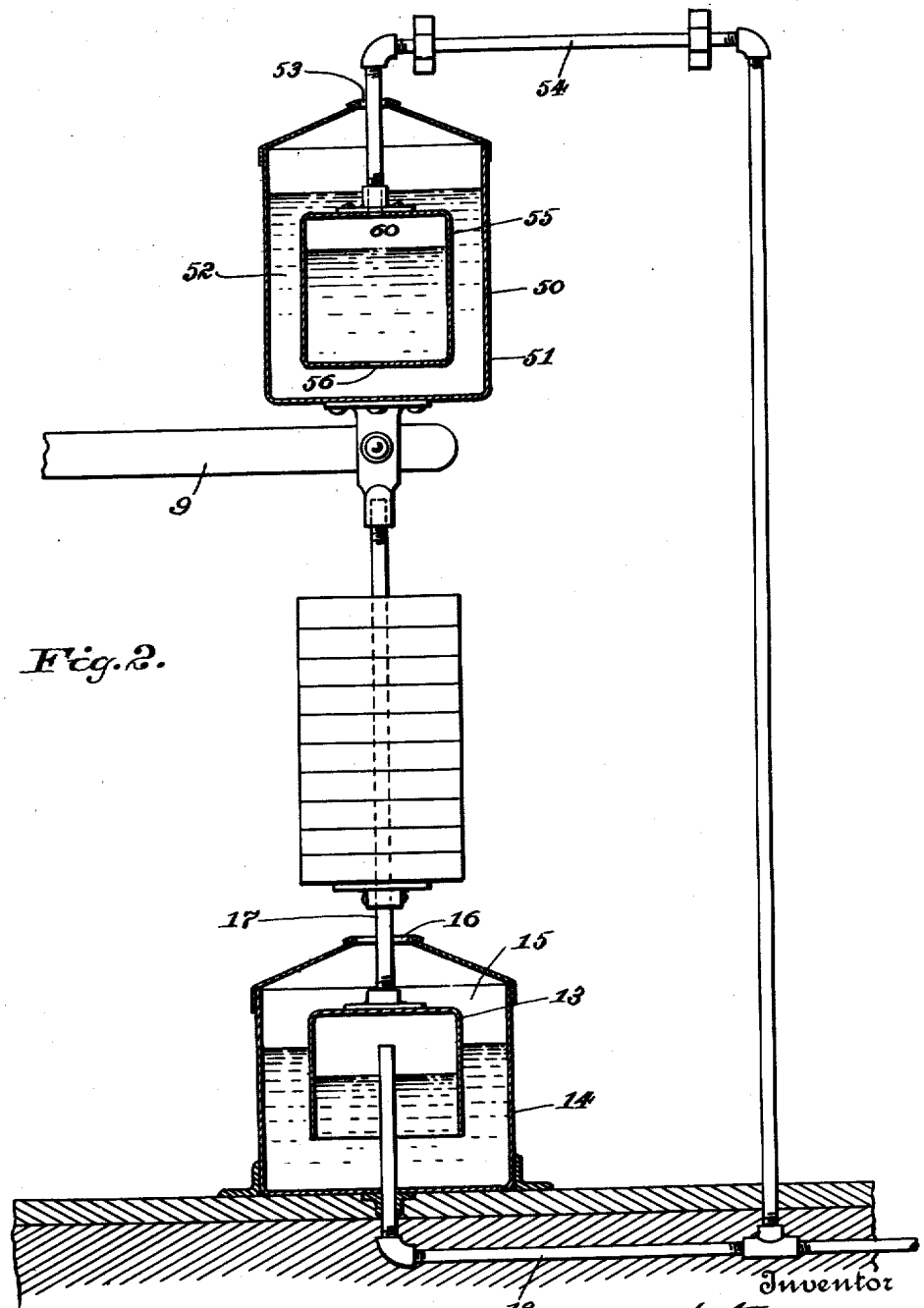

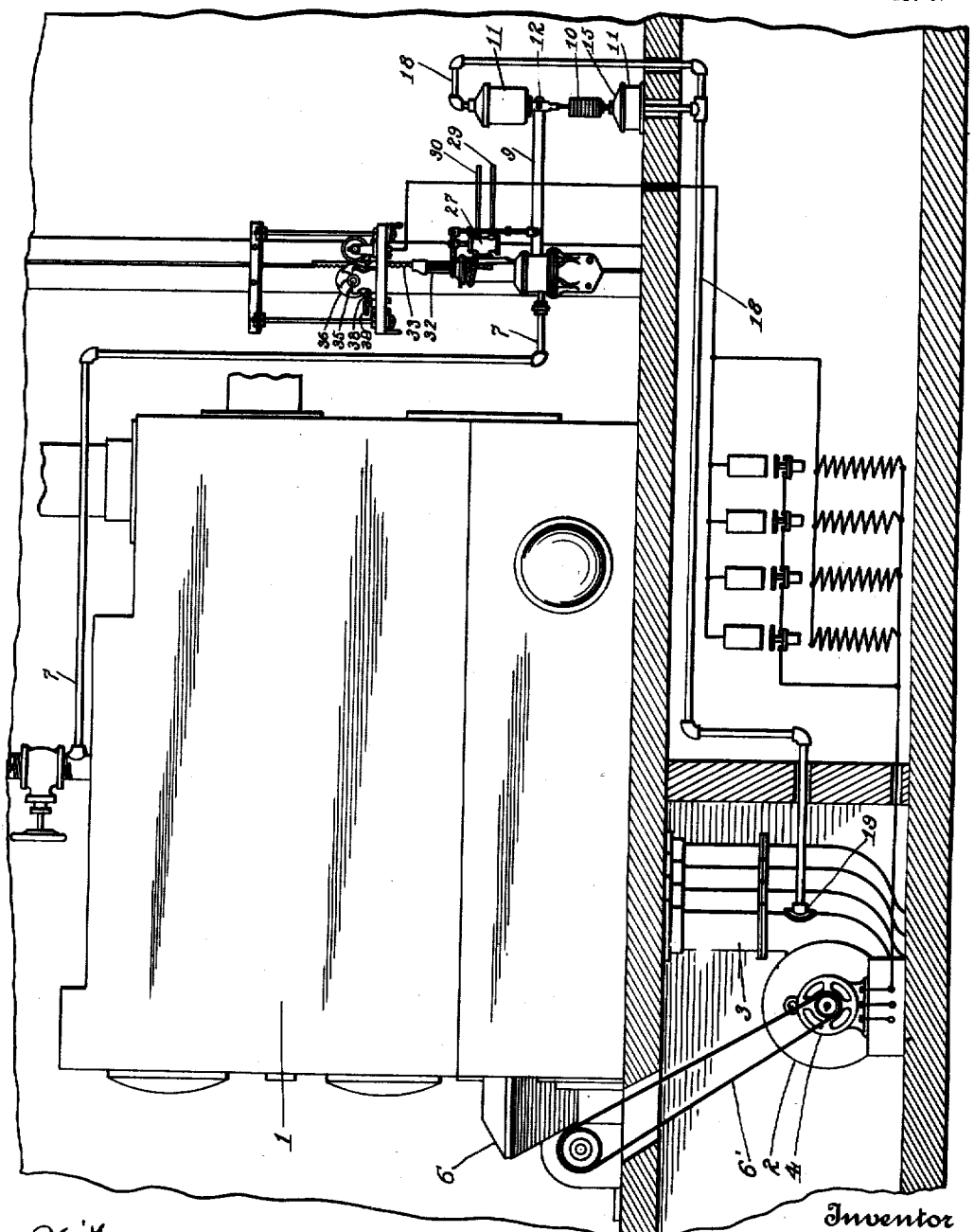

UNITED STATES PATENT OFFICE.

PIERRE O. KEILHOLTZ, OF BALTIMORE, MARYLAND.

REGULATOR.

1,321,054.

Specification of Letters Patent.   Patented Nov. 4, 1919.

Application filed March 17, 1919. Serial No. 283,184.

*To all whom it may concern:*

Be it known that I, PIERRE O. KEILHOLTZ, a citizen of the United States of America, residing in the city of Baltimore, State of Maryland, have invented certain new and useful Improvements in Regulators, of which the following is a specification.

This invention relates to an improvement on or more properly a variation of the method described in my United States Patent No. 1,160,514, dated November 16, 1915, entitled "Method of regulating boiler pressure" intended to increase its field of efficient application. The patented method is utilized in connection with an ordinary boiler pressure regulator which may be of the diaphragm actuated type, the motion of the steam pressure controlled member which in the particular type of commercial regulator shown is a diaphragm, being communicated to a valve determining the flow of a fluid under pressure to a cylinder or equivalent source, the piston in which is driven up or down depending upon the pressure on the diaphragm member or the like which interprets the pressure to be regulated. The piston in turn operates a controller connected to a motor or battery of motors driving the blowers, determining the supply of air or air and fuel to the furnace, for it should be understood that this is primarily a forced draft system.

In this way the draft is changed correctively in response to variations of steam pressure tending to keep this pressure at a predetermined normal. The regulator referred to is only one of various commercial types, and the particular type is not essential to the Keilholtz invention of the patent or of this application. Such regulators are defective in that the phase of operation, *i. e.*, the tendency of the corrective influence exerted is not changed until the steam pressure has passed through normal, that is, if the steam pressure is being built up, the intensity of the fire is increased until it causes the steam pressure to pass through normal when the opposite phase of correction immediately becomes necessary.

This causes racing, and the Keilholtz invention of Patent No. 1,160,514 prevents racing by utilizing the variation of draft pressure to stop the regulating action at intervals as the pressure builds up or drops off in response to the action of the diaphragm regulator, so that no further variation of blower speed or draft results unless the pressure on the diaphragm indicates the necessity for such change.

In the form of the Keilholtz apparatus illustrated; this has been accomplished by causing the variations in air supply pressure to react on the regulator, returning it to normal after each unit change of draft pressure. As applied this is brought about by causing the change in draft pressure to reduce or increase the effect of the counter-balance, reducing it when the draft is increased in regulating, tending to build up steam pressure, and increasing it when the draft is reduced in regulating to reduce steam pressure.

The apparatus shown consists of a submerged bell connected to the counter-balance and having a tube leading from an air space under the bell to this draft. When there is under the bell to this draft. When there is an excessive continuous load, necessitating the generation of a large amount of steam, it is found that the increased draft through the submerged bell by reducing the effect of the counter-weight and causing this reduced effect to continue as long as the excessive demand for steam continues, causes a reduction of the pressure at which the regulator operates and thus reduces the boiler pressure. This reduction is so small that it is ordinarily immaterial. The known instances in which it is of importance and which have caused the development of the apparatus of the present invention, occur when the patented regulator is applied to one or more boilers composing a battery, the other boilers being otherwise regulated. Such reduction of pressure however slight may be sufficient to throw the load on the unregulated boilers. As this particular error is present only when the excess demand for steam is continuous over a considerable period, correction is only desirable under like circumstances, that is, when the regulator is continually operated in one phase, usually sub-normal steam and increased draft phase, for a considerable period. The method of regulation by which this correction is introduced consists in varying the air supply pressure and causing the variations in air supply pressure to react upon the regulator, and further utilizing the variations in air supply pressure correctively with a time element of retardation in opposition to said reaction on the regulator, and changing the corrective force as the reaction is prolonged.

To this end the apparatus by which the method of the present invention is practised, includes, in addition to the submerged bell connected to the counter-balance as shown in the patent, which tends to decrease the total of counter-weight as the draft increases and increase the total of counter-weight as the draft decreases, a second variable element which tends to increase the total counter-balancing force when an excess draft has prevailed for a considerable period and there is a tendency to reduce steam pressure and to decrease the total counter-balancing force when the draft has been decreased for a considerable period, which might tend to slightly increase steam pressure.

In the patent the apparatus shown, as means for carrying out the patented method, includes, as already pointed out, a partially submerged bell connected to the counter-balance lever with connections to the draft for controlling the air pressure within the bell. As the draft pressure increases, the weight of the bell, which is part of the counter-weight, decreases. To overcome this decrease, if it tends to become permanent by a prolongation of the load and hence of the increased draft, I have provided a liquid counter-weight supported by the counter-balance lever on the weighted side, the same being connected to a tank having an air space connected to the draft, the connection between the counter-weight and the tank or liquid receptacle being restricted. As the draft pressure increases, liquid is expelled from the stationary tank and added to the counter-weight, and as the draft pressure decreases, the liquid flows from the counter-weight back into the stationary tank, reducing the counter-weight.

In this way any objectionable effect of the bell tending to establish a permanent difference in steam pressure, is countered and eliminated. At the same time, the retarding effect of the small orifice connecting the liquid counter-weight to the stationary tank or reserve which is shown as inside the liquid counter-weight, permits the bell to retain the step by step action which was the principal object and accomplishment of the prior patented invention.

In the accompanying drawings I have illustrated portions of a boiler regulator to which features making it possible to operate the regulator in accordance with the method of my invention have been applied.

Fig. 2 shows the counter-weight lever fragmentarily with the variable counter-balance and submerged bell in section.

Fig. 3 is a diagrammatic view of the steam plant and regulator.

Figure 1:
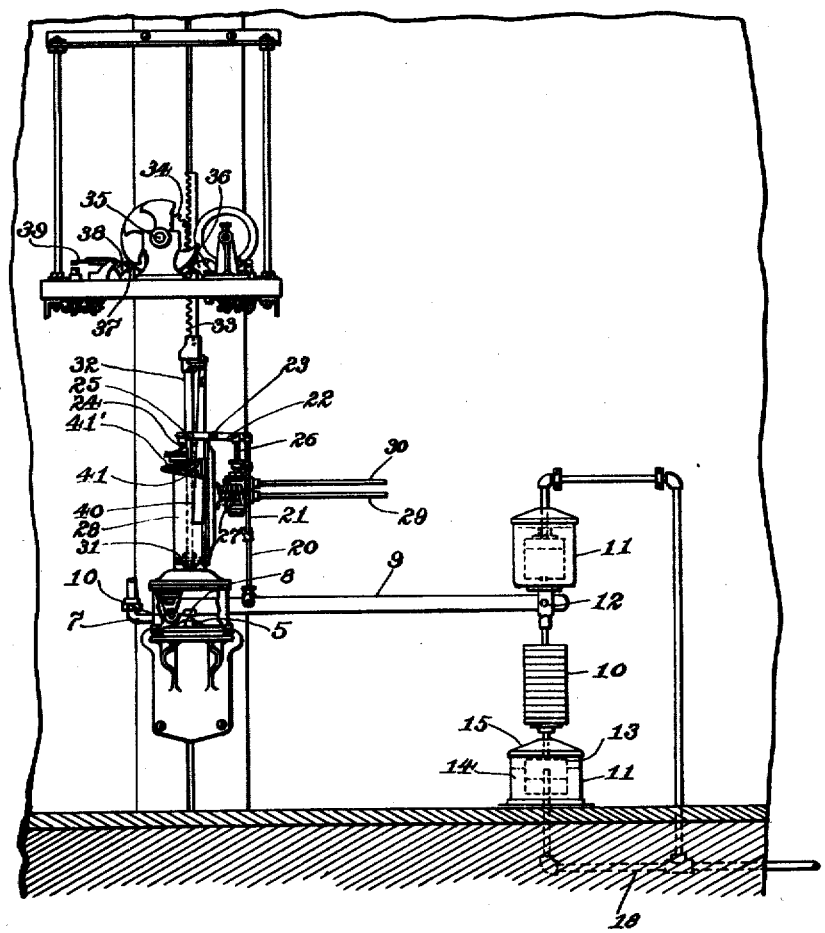
Figure 1 is an elevation showing a commercial regulator, the same including a counter-balance lever, to which is connected a submerged bell and variable counter-weight operating in accordance with my invention.

Referring to the drawing by numerals, each of which is used to indicate the same or similar parts in the different figures, the illustration includes a boiler furnace 1 and a blower 2, delivering air under pressure beneath the grate by means of delivery pipe 3. The blowers may be of any desired number; in the present instance there are four, each being driven from a suitable source of power, for which purpose I have illustrated an individual motor 4 in connection with each blower. Preferably there is also an automatic stoker 6, the stoker being driven from or connected to the corresponding blower, as by a belt 6'.

The drawing shows a diaphragm 5 to which boiler pressure is communicated by a pipe 7. The diaphragm carries an upwardly disposed knife edge or the equivalent element 8 which engages a horizontal counter-balance lever 9, pivoted at 10. The lever 9 carries the counter-balance 10 and corrective members 11 incident to the present invention.

According to the arrangement of the commercial regulator shown, the lever 9 is connected by means of a rod 20 including a link 21 to a pivoted horizontal lever 22 which in turn is pivotally connected to the swinging end 23 of a bell crank lever 24 mounted on a stationary pivot 25, and the lever 22 is further connected by means of a rod 26 to a pivot valve 27 which controls the flow to and from the controller-actuating cylinder 28. The valve 27 has two connections, one to the pressure pipe 29 and one to the outlet or relief pipe 30, and two corresponding ports connected to the upper and lower ends of the hydraulic controller cylinder 28 respectively. As the lever 9 swings up actuated by the rising of the diaphragm 5 due to the increase of boiler pressure, the rod 26 being likewise moved upward, causes the fluid, usually water under pressure, to enter the lower end of the cylinder 28, the upper end of the cylinder being exhausted through a relief pipe 30, and the piston 31 moves upward. The reverse action of the diaphragm due to decrease in boiler pressure below normal causes the piston to move downward. The piston 31 in the cylinder 28 carries an upright rod 32 to which is secured a toothed rack 33. This rack meshes with the teeth of the gear 34 on the shaft 35, carrying cams 36 which engage rollers 37 on the lever arms 38 which when electrically driven blowers are used may be connected to the switches 39. In the ordinary form of this apparatus which is well known, each of the switches 39 when closed serves to cut out a block of resistance in series with the motors so that when the switch is in, the motor speed and resulting draft and in, if so connected the fuel fed are definitely increased, and when the switch is out, the motor speed and draft, etc., dependent thereon are reduced.

In order that there may be a proper check upon the action of the hydraulic cylinder, a wedge 40 is provided. This is suspended from the piston rod and acts on the follower 41 on the depending end of the bell crank lever 24, the same being held against the wedge by a spring 41' which is compressed when the regulator acts in response to the increased boiler pressure with the rod 32 moving upward. The wedge 40 likewise moving upward engages the follower 41 and swings the bell crank lever righthanded about its center, moving the pivot 23 of the lever 22 downward whereby the valve 27 is closed and the motion of the piston arrested until there is a further action of the regulator, giving a step by step action of the regulator until the boiler pressure is formed.

This device serves to increase the draft when the boiler pressure drops below a given point of regulation and vice versa, producing a regulating action, but the lag of the furnace temperature as compared to the draft and boiler pressure is such that this regulation is not sufficiently accurate and the regulator hunts with the usual waste of fuel and loss of boiler pressure. To overcome this difficulty, the invention of the prior patent cited, No. 1,160,514, has added an element by which the changes in draft pressure are utilized correctively to stop the regulating action as soon as a unit or predetermined change of draft pressure is established. In the form shown this is accomplished by means of a bell jar which changes the effect of the counter-balance.

The arrangement of the counter-weights 10 and the submerged bell have been altered in the forms illustrated in the present application, that is, there is a single constant counter-weight proper 10 which can, of course, be varied by the addition of extra disks pivotally connected to and suspended from the counter-weight lever 9 near the outer extremity at 12. To the bottom of this counter-weight there is secured a bell or receptacle 13 open at the bottom and submerged in suitable liquid 14 in a tank or receptacle 15 shown as having a cover provided with an opening 16 for the passage of air and to provide for the free movement of the connecting rod 17 by which the bell and weight are suspended from the lever arm 9. The chamber beneath the bell 13 is connected by means of a pipe 18 to the draft pressure in the throat or delivery pipe of the blower, or draft creating element at 19.

The apparatus so far described has substantially the same operation as the apparatus described in my prior patent cited.

This invention relates to the correction of more or less permanent changes in the effect of the counter-balance incident to long periods of excess draft due to large steam consumption which change the normal steam pressure which the regulator tends to establish. For the purpose of correcting such error, I use the automatic variable counter-weight 50 which may be termed one of the corrective members 11. This consists of a small tank or receptacle 51 carried by the counter-weight lever 9 and containing liquid 52 as hereinafter described. This receptacle has a free opening 53 to the air which is also utilized in the present instance for the admission of a pipe 54 connected to the draft pressure. This pipe extends downward into the liquid and is connected to a small tank or inclosure 55 which as shown is rigidly supported in the liquid by means of the pipe 54.

This tank as shown is of cross-section and preferably approximately equal to that of the bell 13, and its interior is connected by a restricted submerged opening 56 with the water space of the tank 51.

The operation of the commercial steam pressure regulator has been fully explained. In accordance with my method, when the steam pressure drops below the normal, the diaphragm is depressed by the counter-weights, the blowers are speeded up through the connections outlined and the increased draft pressure is communicated by the pipe 18 to the bell 13. This increased draft pressure drives a corresponding amount of water from the bell and either decreases the weight of the bell and water contained or increases its buoyancy according to the preferred expression, reducing the total downward pull on this end of the lever 9, causing immediate cessation of the increase of the draft. If the load is so excessive that the steam pressure does not pick up, the excess draft pressure will continue or increase, effecting a slight reduction of the pressure on the diaphragm and hence of the steam pressure at which the regulator will act to reduce the pressure, so that a large increase of load tends to decrease the normal steam pressure established by the regulator. As has been pointed out, this increase is very slight and of no importance except when a number of boilers, some using the regulator and others not using it are connected together when there will be a tendency to throw the load in case of a large demand for steam on the unregulated boilers. To overcome this I have provided the additional corrective member in the form of an automatically variable counter-balance operating with a retarded effect, as the variation takes place to an appreciable extent only when there is a prolonged change of conditions as a considerable and prolonged increase or decrease of load. Under such circumstances the change in pressure over the liquid, i. e., in the gas or air space 60 of the tank 55 causes an inflow or expulsion of liquid to, or from the tank 55 through the restricted opening 56, making a corresponding change of the counter-balance as a change of the mass of counter-weight which will counter and eliminate the effect of the bell jar 13 due to a permanent considerable change of conditions or load resulting in change of normal steam pressure. At the same time, owing to the retardation of the automatic counter-balance, the bell 13 remains sensitive to draft changes and itself acts correctively to eliminate racing of boiler conditions due to the defective action of the commercial regulator as already described in the prior patent.

More particularly, the counter-balance is acted upon by opposed forces, one of which is a function of the steam pressure applied at S, the other is a constant but adjustable force due to the weight 10. To prevent racing due to the defective operation of the regulator, the variations in air pressure have been caused to react on the counter-balance by means of the bell 13. However, such a reaction, if prolonged, as in the instances already portrayed, might cause an undesirable change of the normal steam pressure, i. e., the pressure to which the regulator acts or tends to return the system. To avoid this, the inventor applies to the counter-balance in opposition to the reaction, a compensating force also determined by the variations of air supply pressure. This corrective force acts in opposition to each reaction, but it is subject to a time element in retardation. In other words, the corrective force is built up as the reaction is prolonged and has a tendency to neutralize the reaction or reduce the sum of the moments in the counter-balance set up by variations of the air supply pressure to zero within a predetermined period after each regulating impulse and reaction.

I have thus described the method of my invention and an apparatus by means of which it may be practised specifically and in detail in order that its application to the art may be clear. However, the details of the apparatus are more essential, and the specific terms describing it are used descriptively rather than in their limiting sense, the scope of the invention being defined in the claims.

1. A method of operating an apparatus including a steam boiler, a furnace and a regulator to control the boiler pressure, which consists in supplying air to the furnace in varying quantities, causing the variations in air supply to react upon the regulator to check the regulating action at intervals determined by the said variations of air supply, and further utilizing the variations of air supply in opposition to said reactions to reduce the effect of each reaction as the period of the reaction progresses.

2. A method of operating an apparatus including a steam boiler, a furnace and a regulator to control the boiler pressure, which consists in supplying air to the furnace in varying quantities, causing the variations in air supply to react upon the regulator to check the regulating action at intervals determined by the said variations of air supply, and further utilizing the variations of air supply to reduce the period of maximum reaction.

3. A method of operating an apparatus including a steam boiler, a furnace and a regulator to control the boiler pressure, which consists in supplying air to the furnace in varying quantities, causing the variations in air supply to react upon the regulator to check the regulating action at intervals determined by the said variations of air supply, and further utilizing the variations of air supply pressure in opposition to said reactions to cut short the period of maximum reaction and prevent change of normal steam pressure due to said reaction.

4. A method of operating an apparatus including a steam boiler, a furnace and a regulator to control the boiler pressure, which consists in supplying air to the furnace in varying quantities, causing the variations in air supply to react upon the regulator to check the regulating action at intervals determined by the said variations of air supply, and further utilizing the variations of air supply correctively in opposition to said reactions, the corrective force being increased as the period of regulation of a single phase progresses.

5. A method of operating an apparatus including a steam boiler, a furnace and a regulator to control the boiler pressure which consists in supplying air and fuel to the furnace at varying pressures in response to variations in steam pressure in the boiler, causing the variation in air supply pressure to react upon the regulator, determining the quantities of air supplied and in instances where there is a prolonged variation of draft pressure of a single phase utilizing said variations of draft pressure with a time element to neutralize the effect of said corresponding reactions to prevent change of normal steam pressure due to the reaction.

6. A method of operating an apparatus including a steam boiler, a furnace and a regulator to control the boiler pressure which consists in supplying air and fuel to the furnace at varying pressures in response to variations in steam pressure in the boiler, causing the variation in air supply pressure to react upon the regulator, determining the quantities of air supplied and in instances where there is a prolonged variation of draft pressure of a single phase utilizing said variation of draft pressure to gradually neutralize the reaction and shorten the period of said corresponding reaction to prevent change of normal steam pressure due to the reaction.

7. A method of regulating the generation and pressure of steam in a steam plant, including a furnace, a boiler and a pressure regulator by varying the generation of heat in the furnace which consists in supplying to the furnace air under pressure in excess of that of the atmosphere, varying the supply pressure to compensate for variations of steam pressure, utilizing these same variations in air supply pressure to prevent hunting by causing them to react on the air supplying means, and in instances where there is a prolonged variation of air pressure of a single phase, utilizing said air pressure in opposition to said reaction to shorten the period of said reaction and to prevent change of normal steam pressure.

8. A method of compensating a steam pressure regulator, which regulator operates by varying the air supply pressure and causing the variations in the air supply to react upon the regulator, said compensating method consisting in further utilizing the variations in air supply pressure correctively in opposition to said reactions on the regulator, and changing the corrective force as the reaction is prolonged.

9. A method of compensating a steam pressure regulator, which regulator operates by varying the air supply pressure and causing the variations in the air supply to react upon the regulator, said compensating method consisting in further utilizing the variations in air supply to generate a corrective force in opposition to said reactions, the corrective force being gradually changed until it neutralizes the reaction or the phase of regulation is changed.

10. A method of regulating the generation and pressure of steam in the operation of an apparatus including a steam boiler, a furnace and a regulator, having a counter-balance acted upon by steam pressure and an opposed constant force determining the normal steam pressure, which method consists in supplying air to the furnace in varying quantities determined by the regulator and causing the variations in air supply to react upon the counter-balance in opposition to each regulating impulse to control the regulating action, and further utilizing correctively the said variations in air supply pressure, tending to reduce to zero after each regulating impulse the sum of the moments of the forces applied to the counter-balance by said variations of air supply pressure.

11. A method of regulating the generation and pressure of steam in the operation of an apparatus including a steam boiler, a furnace, and a regulator having a counter-balance acted upon by the steam pressure and an opposed constant force, which method consists in supplying air to the furnace in varying quantities determined by the regulator and causing the variations in air supply to react upon the counter-balance in opposition to each regulating impulse to control the regulating action, and further utilizing the said variations in air supply pressure correctively, tending to balance after each regulating impulse the moments of the forces applied to the counter-balance by said variations of air supply, said corrective action being subject to a time element which causes it to lag behind the reaction, and increase and approach the force of the reaction as the phase of regulation and hence the reaction are prolonged.

12. A method of regulating the generation and pressure of steam in the operation of an apparatus including a steam boiler, a furnace and a regulator, having a counter-balance acted upon by the steam pressure and an opposed force determining the normal steam pressure, which method consists in supplying air to the furnace in varying quantities fixed by the regulator, causing the variations in air supply to react upon the counter-balance to control the regulating action, and utilizing the same variations in air supply pressure correctively but subject to a lag tending to neutralize the reactions.

13. A method of regulating the generation and pressure of steam in the operation of an apparatus including a steam boiler, a furnace and a regulator, having a counter-balance acted upon by the steam pressure and an opposed force determining the normal steam pressure, which method consists in supplying air to the furnace in varying quantities fixed by the regulator, causing the variations in air supply to react upon the counter-balance to control the regulating action, and utilizing the same variations in air supply pressure correctively, tending to neutralize the reactions, the corrective action being subject to a predetermined lag relatively to the reactions.

14. A method of operating a steam pressure regulator in connection with a boiler and furnace which acts by varying the air supply pressure to overcome variation of steam pressure, the method consisting in causing the variations in air supply to react on the regulator against each regulating impulse and compensating said reactions by an opposed force resulting from the same variations of air supply pressure subject to a time element of retardation.

Signed by me at Baltimore, Maryland, this 14th day of March, 1919.

PIERRE O. KEILHOLTZ.

Witnesses:
EDWIN F. SAMUELS,
EMMA WEHMEYER.